(12) United States Patent
Kishi et al.

(10) Patent No.: US 6,687,554 B1
(45) Date of Patent: Feb. 3, 2004

(54) METHOD AND DEVICE FOR CONTROLLING OPTIMIZATION OF A CONTROL SUBJECT

(75) Inventors: Tomoaki Kishi, Iwata (JP); Ichikai Kamihira, Iwata (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 09/579,799

(22) Filed: May 26, 2000

(30) Foreign Application Priority Data

May 28, 1999 (JP) ............................................ 11-150541

(51) Int. Cl.[7] ............................................ G05B 13/02
(52) U.S. Cl. .............................. 700/47; 700/48; 700/50; 701/102; 701/104; 701/106; 701/109; 706/2; 706/13; 706/591; 123/480; 123/675
(58) Field of Search ............................ 700/47–48, 50; 701/102, 104, 106, 109; 706/2, 13, 591; 123/480, 675

(56) References Cited

U.S. PATENT DOCUMENTS 5,897,629 A * 4/1999 Shinagawa et al. ........... 706/13
5,954,783 A * 9/1999 Yamaguchi et al. ......... 123/480
6,324,530 B1 * 11/2001 Yamaguchi et al. .......... 706/13

* cited by examiner

*Primary Examiner*—Anil Khatri
*Assistant Examiner*—Thomas Pham
(74) *Attorney, Agent, or Firm*—Knobbe, Martens, Olson & Bear LLP

(57) ABSTRACT

Optimization control of a control system by improving evolution efficiency while retaining the advantages of genetic optimization is described. An optimizer for evolving control parameters affecting the characteristics of a control system uses actual user fitness evaluations of various control parameters or control parameters arranged as chromosomes. Parameters or chromosomes for a next generation are pre-processed using an evaluation model that estimates the fitness of new chromosomes before the chromosomes are presented to the user. Chromosomes that have a low estimated fitness value are modified or deleted, thereby reducing the number of low-quality chromosomes evaluated by the user.

19 Claims, 16 Drawing Sheets

METHOD AND DEVICE FOR CONTROLLING OPTIMIZATION OF A CONTROL SUBJECT

BACKGROUND OF THE INVENTION

1. Field of the Invention

This invention relates to methods and devices for improving the optimization of a control system.

2. Description of the Related Art

Optimizer-based control systems use an optimizer to program the operation of a controller that controls the operation of a controlled object. The controlled object is also referred to as a process "plant." The optimizer adjusts the operation of the controller to improve the overall operation of the plant. The optimizers used in many optimized control systems rely on a genetic algorithm. Using a set of inputs, and a fitness function, the genetic algorithm works in a manner similar to the process of biological evolution to arrive at a solution which is, hopefully, optimal. The genetic algorithm generates sets of chromosomes and then sorts the chromosomes by evaluating each chromosome using the fitness function. Each chromosome corresponds to one embodiment, or variation, of the controller. For example, in a controller that has several adjustable parameters (such as, for example, several gain parameters) each chromosome corresponds to one set of gain settings.

In a control system based on a genetic optimizer, various parameters relating to the characteristics of the control system and/or the controlled plant are coded into one or more chromosomes, where each chromosome represents an individual. A generation of individuals is represented as a set of chromosomes. The individuals are evaluated using the fitness function to determine which chromosomes produce better control characteristics and which chromosomes produce poorer control characteristics. In other words, the fitness function is used to perform a genetic fitness evaluation of each chromosome to determine which chromosomes are genetically most fit (that is, produce the best control characteristics). The best individuals (chromosomes) are typically chosen to be the parents for the next generation of chromosomes. Some number of the lesser individuals are also typically chosen, usually at random, to be included in the next generation. The inclusion of lesser individuals is done to increase genetic diversity and to avoid optimizing towards a local optimum (rather than a more desirable global optimum). Genes (parameters) from the parent chromosomes are crossed and mutated to generate the next generation of individuals. The control parameters of the control module are evolved to find those chromosomes capable of obtaining characteristics of high fitness evaluations (good control) by repeating the above process.

Unfortunately, the above optimization method often exhibits poor efficiency. Many of the new chromosomes produce very poor control Characteristics and end up being discarded. Thus, evolution of each generation does not always proceed in a desirable direction towards a global optimum value. In some cases, the optimization proceeds away from an optimum value for a period of time. This can occur because of the inclusion of lesser individuals. It can also occur because of the random mutations created in each new generation.

To improve the efficiency of the evolution process, it is sometimes possible to use only the best and the second-best individuals of a generation as the parent individuals for the next generation, or to reduce the mutational generation of new individuals. However, being too strict when choosing the parent individuals for the next generation or stopping the mutational generation of individuals can reduce genetic diversity to a value that is too small to support good optimization. Reducing the genetic diversity, particularly in the initial evaluation stages, can have the effect of restricting the direction of the evolution such that the evolution proceeds to a local optimum rather than a global optimum. Therefore, it is undesirable to restrict the direction of evolution as described above, especially during the initial stage of evaluation.

The presence of inefficiencies in a genetic optimization is especially undesirable when the fitness evaluation is based on a user analysis (as in the case when a user manually selects the best chromosomes). Users can become annoyed when repeatedly forced to perform a fitness evaluation on clearly inferior chromosomes. However, maintaining genetic diversity is important when a user is responsible for picking those chromosomes that survive. When a user is evaluating the chromosomes, it can be difficult to evaluate the system being optimized according to some objective standard, because the evaluation of good versus bad chromosomes can vary with the ever-changing emotions and physical conditions of the user.

SUMMARY

The present invention solves these and other problems by controlling the optimization of a control system, making it possible to improve the evolution efficiency of a genetic optimizer without unduly sacrificing genetic diversity.

One embodiment includes an optimizing control system wherein control parameters affecting the characteristics of the system are made to evolve under the direction and guidance of a user or operator. The optimizer creates a group of individual chromosomes corresponding to the control parameters being optimized. The user evaluates the chromosomes and assigns a fitness value to each chromosome. Parent individuals for the next generation are chosen based, at least in part, on fitness evaluations provided by the user. A set of candidate chromosomes for the next generation is created from the parent chromosomes. An evaluation model is then used to calculate estimated (predicted) fitness evaluations for the candidate chromosomes. The candidate chromosomes are used to create the chromosomes for the next generation, however, candidate chromosomes that do not meet a defined estimated fitness standard are replaced or modified so that the estimated fitness evaluation values for the actual chromosomes in the next generation meet a certain fitness standard. The user then provides actual fitness evaluations for each chromosome in the next generation.

The evaluation model uses the user fitness evaluations of previous chromosomes to estimate (or predict) how the user will evaluate new chromosomes. In this way the candidate chromosomes to which user will probably give low rankings will not be presented to the user. This saves the user from the tedium of evaluating chromosomes that produce poor control characteristics, and it reduces the number of chromosomes that are evaluated by the user in the process of finding an optimum chromosome. In one embodiment, the fitness model adapts to user preferences. In one embodiment, the fitness model is based on a learning algorithm.

One embodiment includes an optimization control device having a control module, an online-type of optimization process module, and an evolution efficiency-improving module. The control module outputs a control value to a plant on the basis of specified input information. The online-type of optimization process module causes the control parameters affecting the characteristics of control system to evolve based on actual fitness evaluations by repeatedly: creating a group of individuals corresponding to the control parameters in the control device; selecting a set of the individuals to be a current generation; choosing parent individuals for a next generation from the current generation based on actual (e.g., user-specified or fitness-function calculated) fitness evaluations; and creating a set of individuals for the next generation from the parent individuals. The evolution efficiency-improving module includes: a fitness evaluation model-creating module for creating/ updating a fitness evaluation model on the basis of a relationship between previous chromosomes and the actual evaluation values of the previous chromosomes; and an individual-set operating module for pre-processing the next generation of chromosomes by using the fitness evaluation model to compute estimated fitness evaluation values. Chromosomes with low estimated fitness evaluation values, are replaced or modified before being used to make actual fitness evaluations.

BRIEF DESCRIPTION OF THE DRAWINGS

The advantages and features of the disclosed invention will readily be appreciated by persons skilled in the art from the following detailed description when read in connection with the drawings listed below.

Figure 1A:
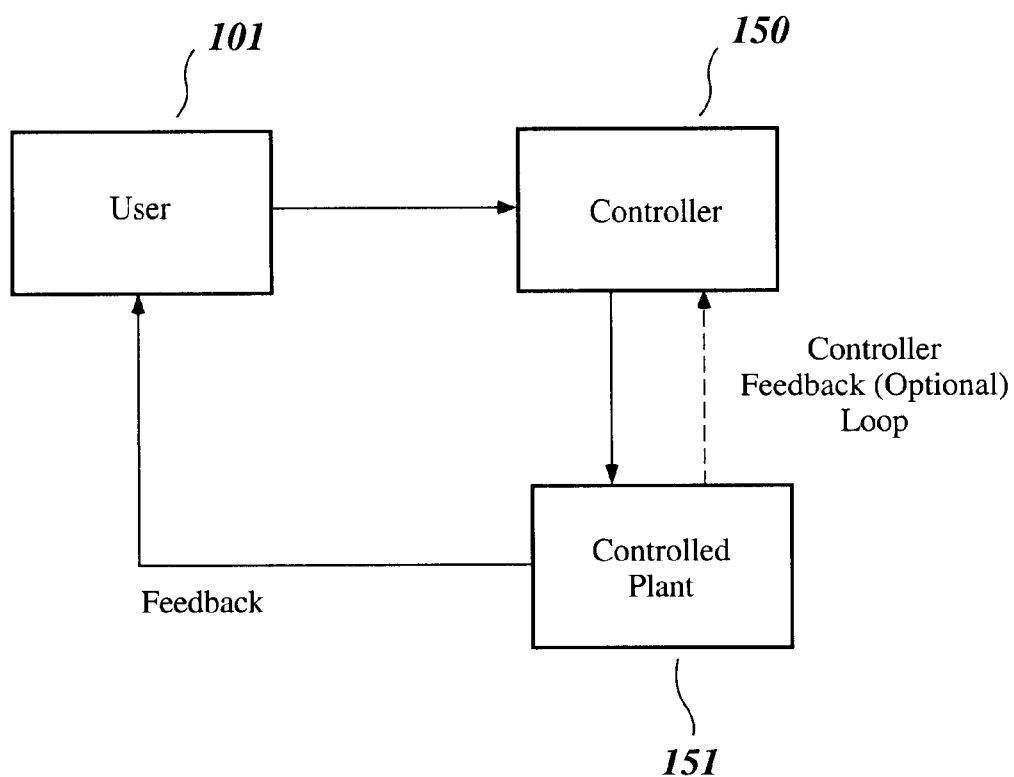
FIG. 1A is a block diagram of a user-controlled plant controlled by a non-optimizing controller.

In the drawings, the first digit of any three-digit number generally indicates the number of the figure in which the element first appears. Where four-digit reference numbers are used, the first two digits indicate the figure number.

DETAILED DESCRIPTION

FIG. 1A is a block diagram of a user-controlled plant 151 controlled by a controller 150. A user 101 provides command inputs to the controller 150. The controller 150 provides control information to the controlled plant. The user 101 typically receives feedback information from the plant by watching the operation of the plant or by sensing the operation of the plant. Optionally, the plant 151 also provides control feedback signals to the controller 150.

For example, if the plant 151 is a home heater, and the controller 150 is a thermostat, then the user 101 receives feedback information by sensing the temperature of the air in the room. The user 101 provides command inputs to the controller 150 by setting a desired temperature on the thermostat. The controller 150 (thermostat) receives feedback from the plant by sensing the temperature in the room.

Figure 1B:
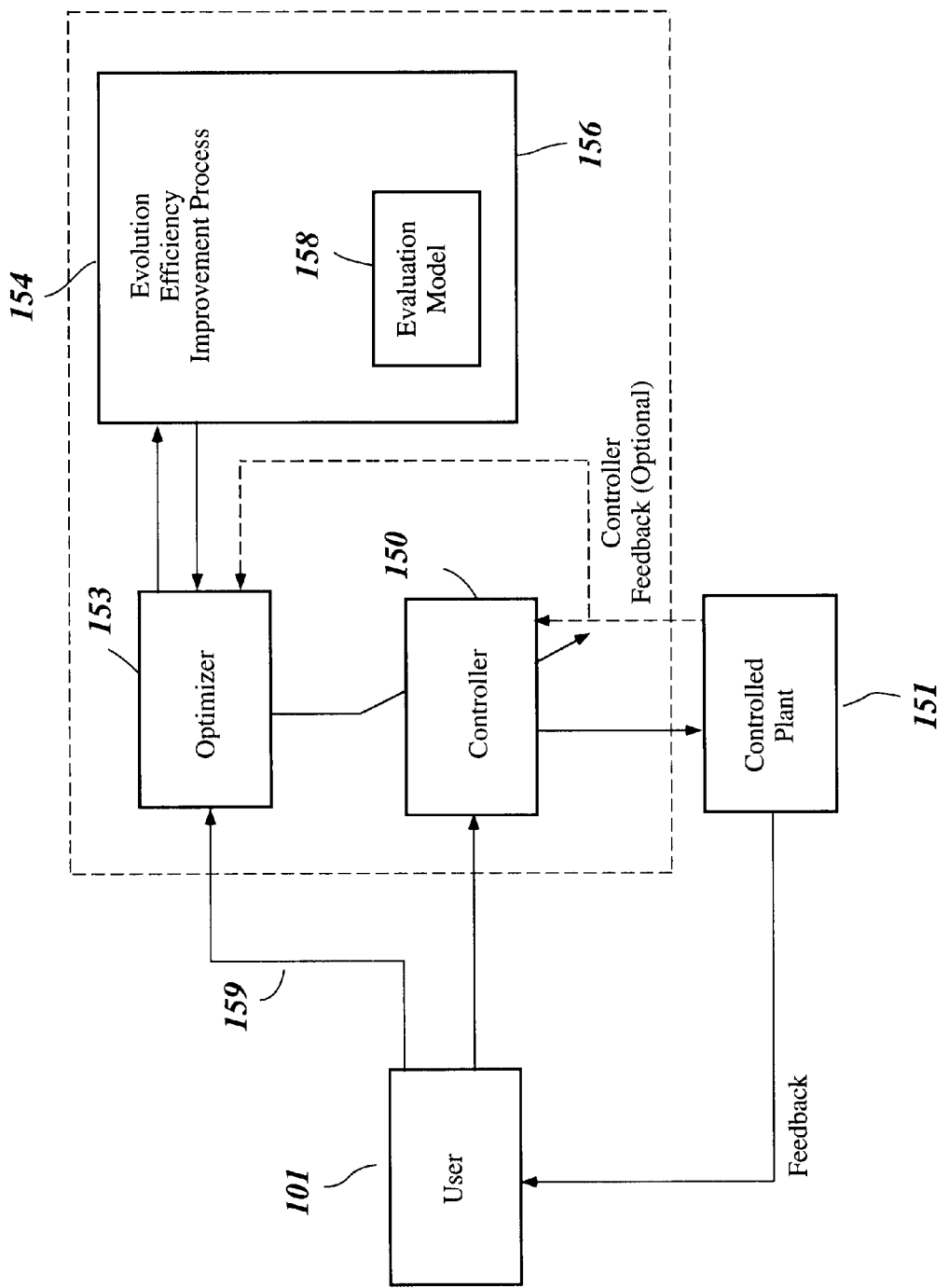
FIG. 1B is a block diagram showing a user-controlled efficiency-improved optimizing control system to control a plant.

FIG. 1B is a block diagram showing a user-controlled efficiency-improved optimizing control system 154 to control the plant 151. The system 154 includes the controller 150, an optimizer 153, and an evolution efficiency improvement process (EEIP) 156. The user 101 provides commands to -the controller 150. The optimizer 153 adjusts the operation of the controller 150 to cause the controller 150 to control the plant 151 in an optimal manner. The user 101 also provides evaluations 159 to the optimizer 153 to tell the optimizer how well the plant 151 is being controlled. Optionally, the plant 151 provides feedback information to the optimizer 153. The optimizer provides optimization data to, and receives optimization data from, the EEIP 156.

The EEIP 156 improves the optimization efficiency of the optimizer 153. In one embodiment, the EEIP 156 optimizes the optimizer 153. In one embodiment, the EEIP 156 includes an evaluation model 158. The evaluation model 158 is a model that estimates the performance of control parameters generated by the optimizer before the control parameters are provided to the controller 150. The evaluation model 158 allows the optimizer 153 to "try out" various candidate control parameters without incurring the overhead of actually programming the candidate control parameters into the controller 150 and then waiting for the user 101 to provide new evaluations based on the candidate control parameters. In one embodiment, the evaluation model 158 is a predictive model that predicts how the user 101 will evaluate the candidate control parameters. In one embodiment, the evaluation model 158 is an adaptive model that adapts to user preferences. In one embodiment, the evaluation model 158 is a learning model that learns to predict user preferences.

Figure 1C:
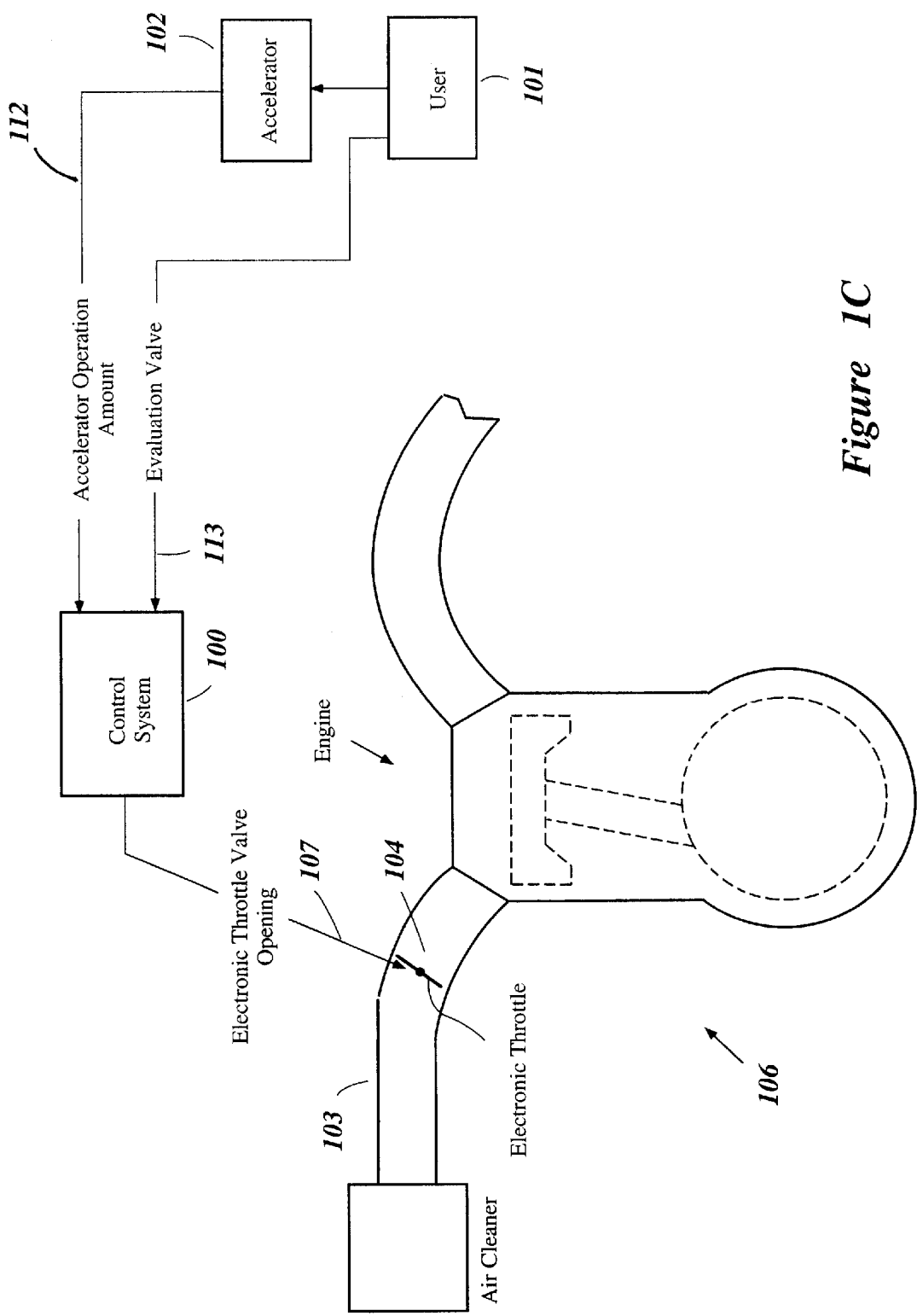
FIG. 1C is a block diagram showing the efficiency-improved optimizing control system where the plant is an engine in a user-operated vehicle and the controller is used to control an electronic throttle.

FIG. 1C is a block diagram where the efficiency-improved optimizing control system 154 is an engine-control system 100 and where the plant 151 is an engine 106 in a user-operated vehicle. The engine-control system 100 is used to control an electronic throttle 104. The user 101 operates an accelerator 102 to provide an accelerator value 112 to an accelerator input of the engine-control system 100. The user 101 also provides optimizer evaluation values 113 to an evaluation input of the engine-control system 100. The engine 106 includes an input manifold 103. The electronic throttle 104 is positioned in the intake manifold 103. A throttle output from the engine-control system 100 is provided to an input of the electronic throttle 104.

The electronic throttle 104 is controlled by the engine-control system 100 according to the operation of the accelerator 102 by the user 101. The engine-control system 100 is configured to provide throttle characteristics matching the preference of the user 101. The engine-control system 100 receives input information from the accelerator (based on user-operation of the accelerator 102) and provides an output to control the throttle opening of the electronic throttle 104.

The Engine-Control System

Figure 2:
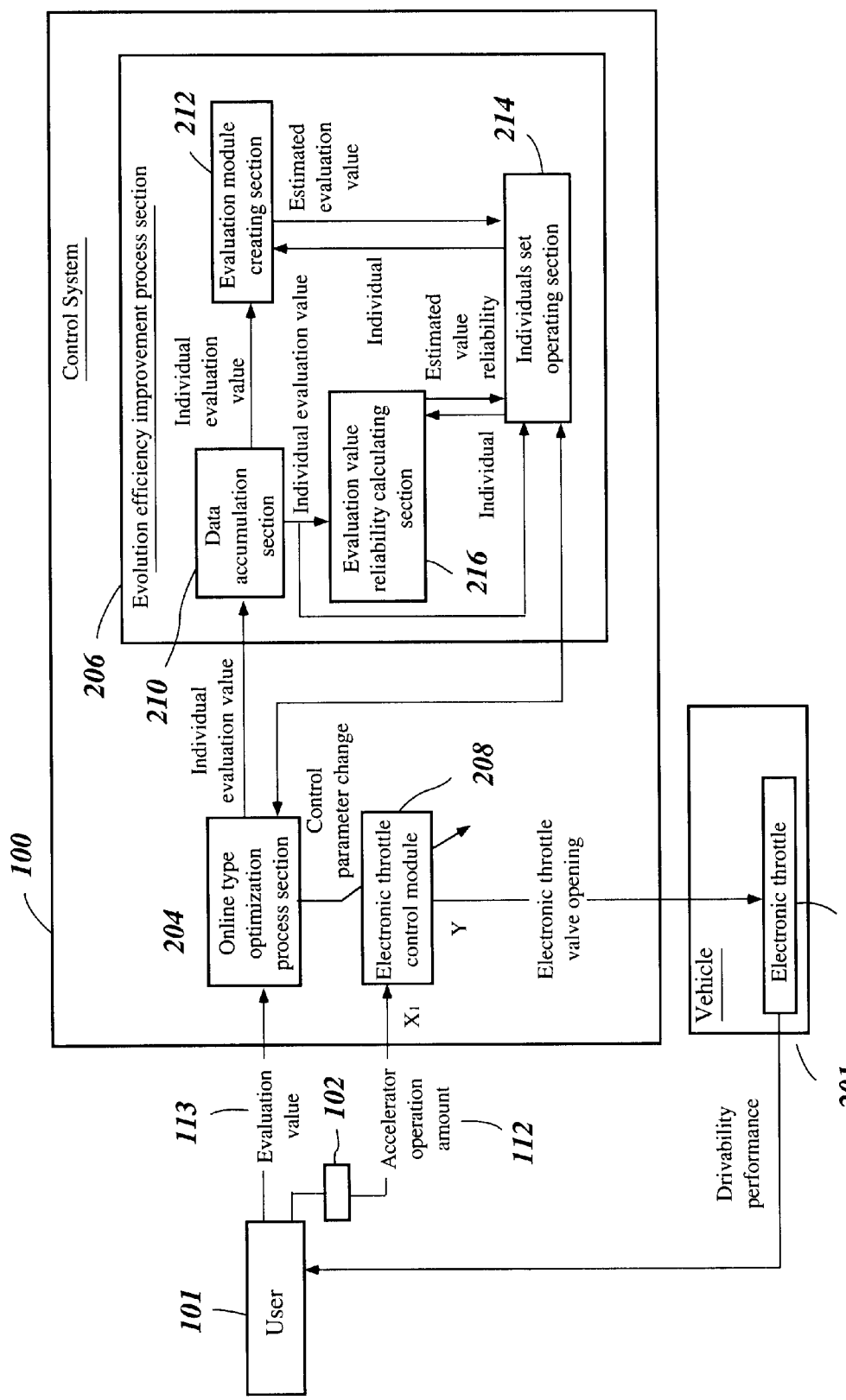
FIG. 2 is a general block diagram of the optimizing controller.

FIG. 2 is a block diagram of the engine-control system 100, including a throttle-control module 208, an online optimizer 204, and an evolution efficiency-improvement process (EEIP) module 206. The throttle-control module 208 determines the electronic throttle valve opening based on the accelerator value 112. The optimizer 204 provides operating parameters to control the characteristics of the throttle-control module 208. The user 101 provides the evaluation values 113 to an evaluation-value input of the optimizer 204. The accelerator value 112 is provided to an accelerator value input of the throttle-control module 208.

The EEIP 206 includes a data accumulator 210, a model-creator 212, an individual-set module 214, and a reliability module 216. The genetic optimizer 204 provides information about chromosomes and the fitness values for the chromosomes to be stored by the data accumulator 210. The data accumulator 210 provides stored chromosome and fitness values to the reliability module 216, to the model-creator 212, and to the individual-set module 214. The genetic optimizer 204 provides candidate chromosomes to the individual-set module 214, and the individual-set module provides next-generation chromosomes back to the genetic optimizer 204. Candidate chromosomes are provided from the individual-set module 214 to the model creator 212, and the evaluation model-creator 212 returns estimated evaluation values to the individual-set module 214. Chromosomes are provided from the individual-set module 214 to the reliability module 216, and the reliability module 216 returns an evaluation reliability value to the individual-set module 214.

The optimizer 204 evolves control parameters for the throttle-control module 208 according to evaluations made by the user 101 while the user is operating (e.g. driving, riding, etc.) the vehicle equipped with the engine 106. This allows the user 101 to obtain desired throttle characteristics. The EEIP 206 improves the efficiency of the evolution process in the optimizer 204.

The user 101 directs the optimization process by rating the fitness of chromosomes generated by the optimizer 204. The fitness evaluation is a subjective evaluation based on what kind of throttle-response characteristics the user 101 likes. The EEIP 206 improves the efficiency of the optimization process by developing an evaluation model that estimates how the user will rate the fitness of a particular chromosome. The evaluation model is used to improve the creation of chromosomes for each new generation.

The Throttle-Control Module

Figure 3:
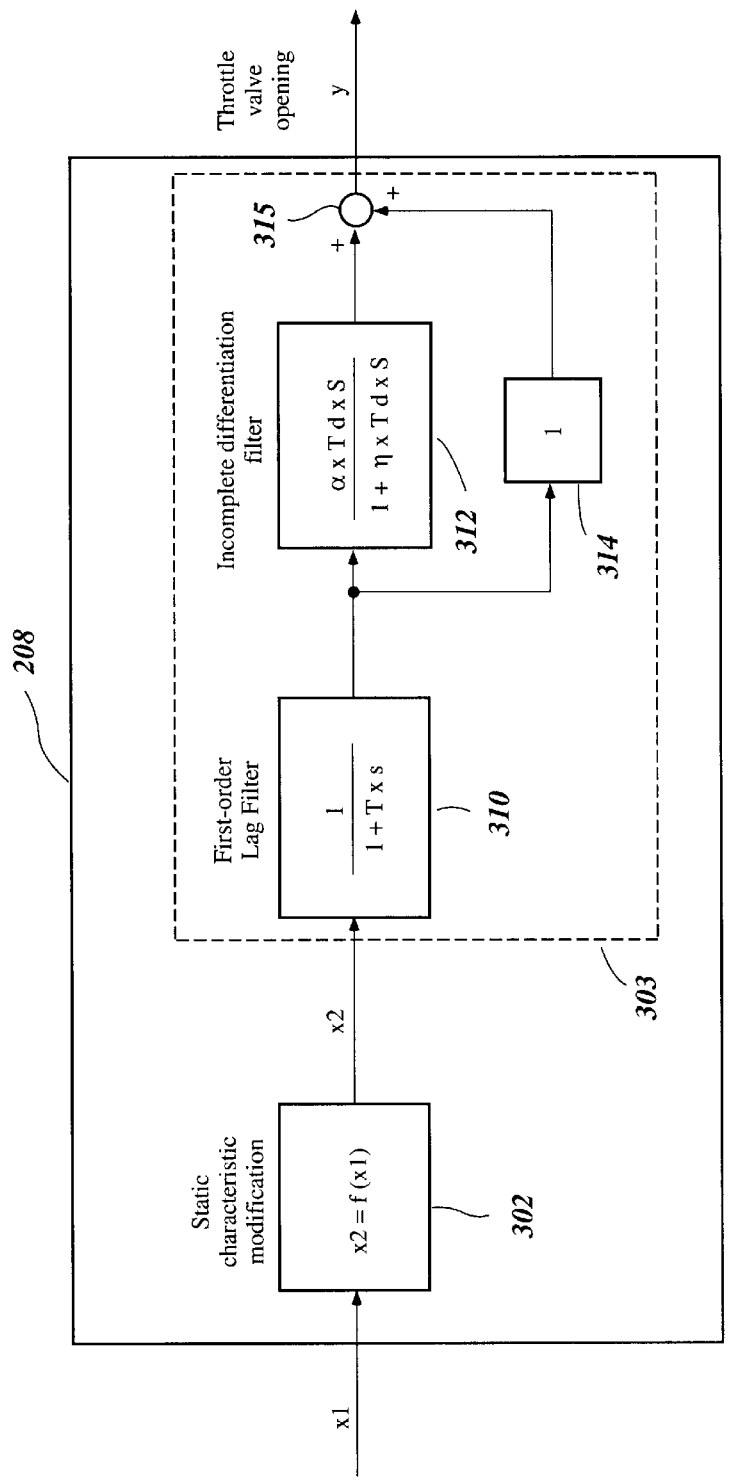
FIG. 3 is a general block diagram of an throttle-control module.

The throttle-control module 208, shown in more detail in FIG. 3, includes a static control module 302 and a dynamic control module 303. A throttle input $x_1$ is provided to the static control module 302. An output $x_2$ of the static control module is provided to an input of a primary delay filter 310. An output of the primary delay filter 310 is provided to an input of an incomplete-differential filter 312 and to an input of a gain block 314. An output of the gain block 314 is provided to a first input of an adder 315, and an output of the incomplete-differential filter 312 is provided to a second input of the adder 315. An output of the adder 315 is provided as a throttle valve opening control output y. The primary delay filter 310, the incomplete-differential filter 312, the gain block 314 and the adder 315 together comprise the dynamic control module 303.

The throttle-control module 208 determines the opening of the electronic throttle valve 104 based on the throttle input $x_1$. The throttle input $x_1$ corresponds to the accelerator value 112. The throttle input $x_1$ includes both information on position (or angle) of the accelerator 102 and information on the derivative (or rate of change) of the position (or angle) of the accelerator 102.

In one embodiment, the primary delay filter 310 has a transfer function D(s) given by:

$$D(s) = \frac{1}{1+Ts}$$

where T is a primary delay time constant (DR). In one embodiment, the incomplete-differential filter has a transfer function I(s) given by:

$$I(s) = \frac{\alpha T_d s}{1 + \eta T_d s}$$

where α is an acceleration compensation coefficient (AG) and η is a differential gain. In one embodiment, the gain block 314 has a gain of unity.

Figure 4:
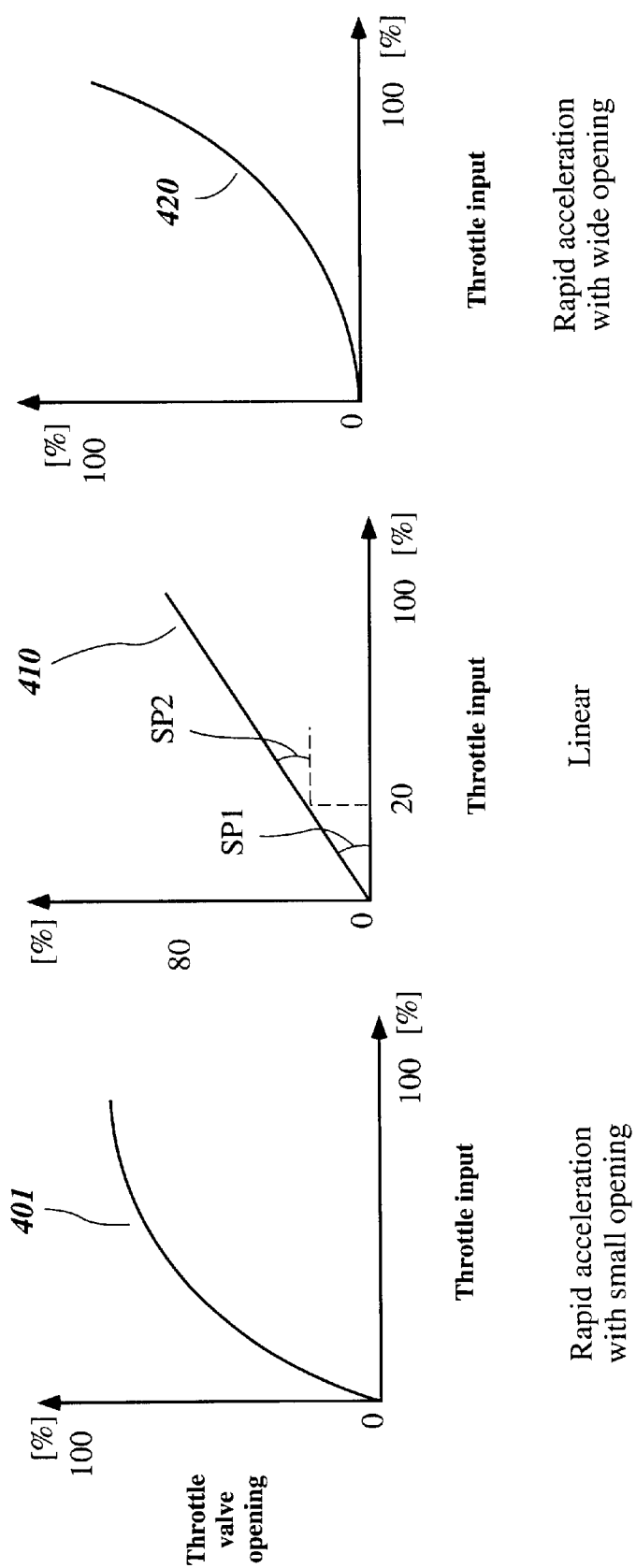
FIG. 4 shows examples of static throttle characteristics.

The electronic throttle valve 104 has both static characteristics and dynamic characteristics. The static throttle characteristic arises from the relation between the accelerator angle and the opening of the electronic throttle valve 104, and affects the steady-state running characteristic of the engine 106. FIG. 4A shows an example of a throttle valve 104 that exhibits rapid throttle opening with a small throttle input. FIG. 4B shows an example of a throttle valve 104 that exhibits linear throttle opening with respect to the throttle input. FIG. 4C shows an example of a throttle valve 104 that exhibits rapid throttle opening with a large throttle input.

The different types of static characteristics, as shown in FIGS. 4A–4C, provide different throttle openings with the same accelerator angle. For example, in FIG. 4A the electronic throttle valve 104 opens relatively wide while the accelerator angle is small, and as the accelerator angle increases, the throttle valve 104 opening converges gradually to the wide-open state. In FIG. 4B the electronic throttle valve 104 opens linearly in proportion to the accelerator angle. In FIG. 4C the electronic throttle valve 104 opens gradually while the accelerator angle is small, and as the accelerator angle increases, the throttle valve opens rapidly.

Typically, the static characteristic is such that the throttle opening generally increases or remains unchanged as the accelerator angle increases. In one embodiment, the static characteristic is simplified by assuming the throttle opening rate can be approximated by a piecewise-linear approximation such that the throttle valve 104 has an approximately linear opening rate SP1 in a first throttle input range and an approximately linear opening rate SP2 in a second throttle input range. In one embodiment, the throttle valve 104 has an approximately linear opening rate SP1 in the range of between 0% and 20% and an approximately linear opening rate SP2 in the range of between 20% and 100%.

The dynamic throttle characteristic stems from the derivative (i.e. the time rate of change) of the throttle valve opening relative to the derivative (time rate of change) of the accelerator position or angle. The dynamic throttle characteristic affects the transient characteristics of the engine 106 and the vehicle. The dynamic characteristic can be configured such that the derivative of the opening of the throttle valve 104 relative to the derivative of the accelerator can be controlled by combining a temporary delay (provided by the temporary delay filter 310) and an incomplete differential (provided by the incomplete-differential filter 312). By combining the temporary delay and the incomplete differential, different types of dynamic characteristics are obtained as shown in FIG. 5.

Figure 5:
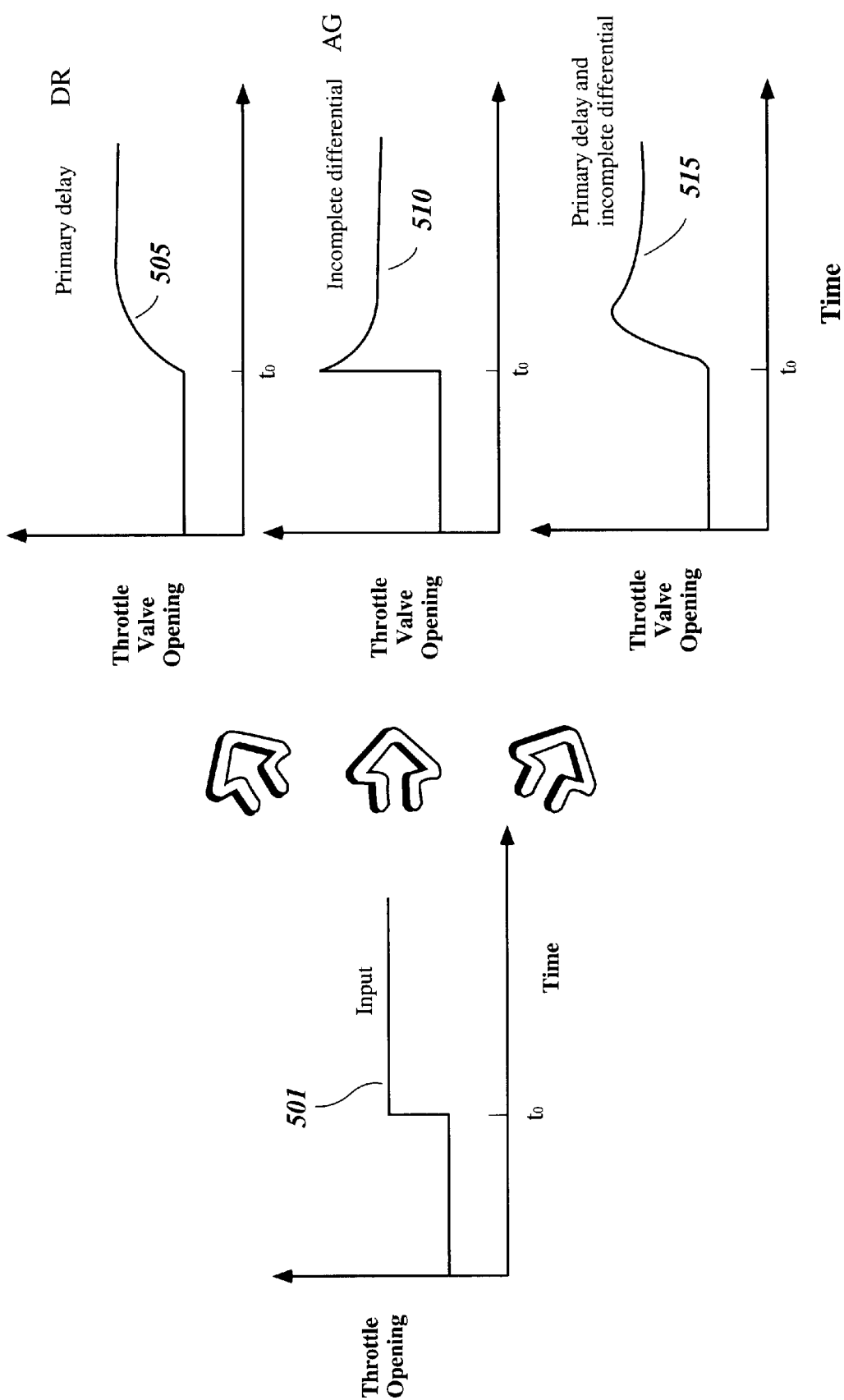
FIG. 5 shows examples of dynamic throttle characteristics.

FIG. 5 shows a throttle input curve 501 that has a positive step at a time $t_0$. A curve 505 shows a slow dynamic response-type throttle opening that opens relatively slowly in response to the input curve 501. The curve 505 shows an overdamped response that rises relatively slowly towards a steady state value. A curve 510 shows a quick dynamic response-type throttle that opens relatively swiftly in response to the input curve 501. The curve 510 shows an underdamped response having a relatively fast rise (with a relatively large overshoot) at $t_0$ followed by a quick decay to a steady-state value. A curve 515 shows a medium dynamic response-type throttle that opens moderately fast in response to the input curve 501. The curve 515 shows a moderate rise at $t_0$ with a small overshoot and a relatively slow decay to a steady-state value.

In one embodiment, the dynamic characteristic is optimized by optimizing the temporary delay time constant DR and the acceleration compensation coefficient AG.

The Optimizer

Figure 6:
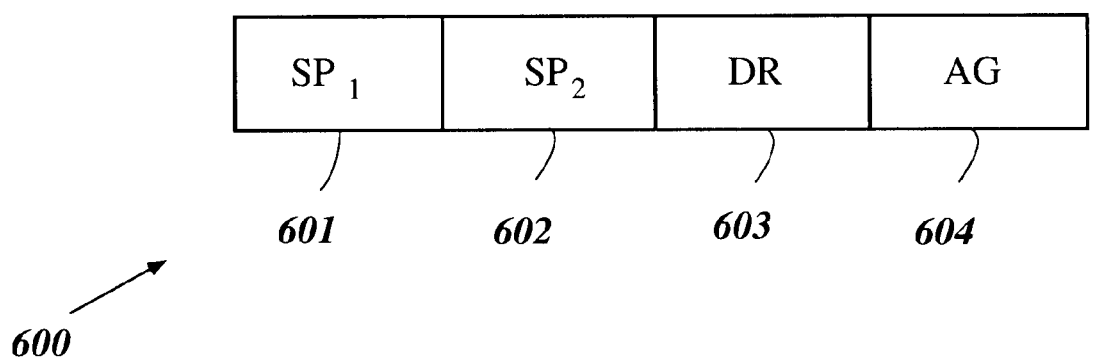
FIG. 6 shows an example of coding of chromosomes.

The optimizer 204 codes the control parameters (e.g. the throttle valve opening rate SP1, the throttle valve opening rate SP2, the temporary delay time constant DR, and the acceleration compensation coefficient AG) in the throttle-control module 208 as a chromosome shown in FIG. 6. The optimizer 204 then optimizes the control parameters using evolutionary (genetic) optimization.

Figure 7:
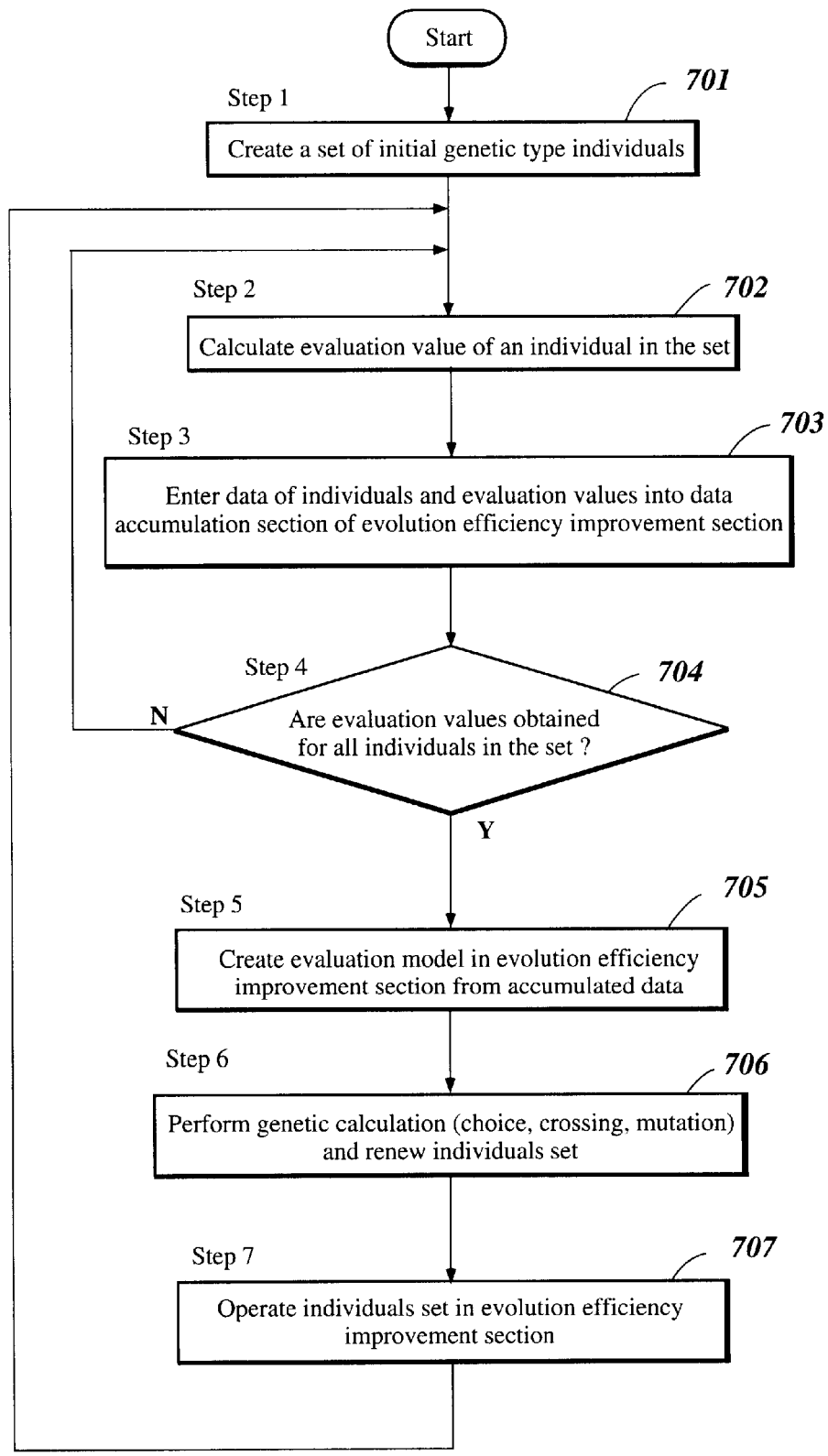
FIG. 7 is a flowchart of the optimization process used with the optimizing controller.

FIG. 7 is a flowchart of the algorithm used by the EEIP 206 to improve the operation of the optimizer 204. First, in a step 701, a set of chromosomes (individuals) is created to form the present generation (in this case, the first generation). Next, in a step 702, the engine 106 in the vehicle is operated using the control parameters from one of the individual chromosomes, and an actual fitness evaluation of the chromosome (e.g. driveability, as evaluated by the user 101) is obtained. The steps 702 and 703 are repeated for the individuals in the present generation by looping through steps, the loop being controlled by a decision block 704 that either loops back to step 704, or advances to a step 705 when the loop is finished.

When the fitness evaluation of the individuals in the present generation is complete, individuals to be the parent individuals for the next generation are chosen from among the individuals of the present generation. In a step 706, the next generation is obtained by crossing of genes from the parents and by mutation of the genes.

The parameters (genes) are optimized using the evolutionary calculation and repeating the above process steps 702–704 until the user-desired optimum is reached or until a predetermined number of generations have been processed.

In one embodiment, the optimization process is arranged such that the fitness evaluation of each individual is made on the basis of driveability as determined by the user 101. As a result, the control parameters of the throttle-control module 208 are optimized according to the evaluations made by the user, and the optimum characteristic of the electronic throttle (driveability) best suited to the user 101 is obtained.

For example, a button or other input device can be provided to allow the user 101 to intervene in the evolution and input a fitness evaluation value while driving. The user 101 can use the button after a trial ride to input a user-specified fitness value for the individual chromosome with which the trial ride has been made. In one embodiment, the user-specified fitness value is specified by the length of the time that the user 101 presses the button. In one embodiment, the user 101 specifies a fitness value using a keyboard, voice command, dial, touch-pad, or other input device. In one embodiment, the reciprocal of the button duration is multiplied by a scaling factor and/or calculated, using a fuzzy rule. In this way, it is possible to obtain an evaluation value with a given accuracy, even if there is ambiguity in the user-specified fitness value, and the user 101 can use the evolution method in interactive manner.

In one embodiment, the user can switch from the evaluation of one: individual chromosome to another. In one embodiment, the user 101 selects a different chromosome by pressing and holding a button for a period longer than a predetermined period. In this manner, it is easy for the user to change an individual chromosome having unsatisfactory driving characteristics, so that the evolution can be made more quickly. In one embodiment, the individual chromosomes are switched while the vehicle is at rest in order to eliminate any adverse effects from a sudden change in the throttle characteristic while the vehicle is being driven.

Various methods can be used to choose the parent individuals for the next generation. In one embodiment, a roulette choice method is used in which individuals are chosen by probability in proportion to their fitness values given by the user 101. In one embodiment, a tournament choice method is used in which an individual chromosome having the best fitness value is chosen from among n individual chromosomes chosen at random. When generations are changed using a strict algorithm, there is a risk of destroying individuals having high fitness values. To avoid this, in one embodiment, an elite-preserving strategy is provided to leave elite individuals (individuals having the highest fitness values) in the next generation.

There are various techniques for crossing parent individuals, including, for example, one point crossing, two point crossing, normal distribution crossing, etc. It can happen that a parent chromosome is chosen for crossing with itself or with an identical chromosome. This can reduce the genetic diversity of the next generation. In one embodiment, individual chromosomes are not crossed with themselves or with identical chromosomes.

In one embodiment, mutation is provided, wherein values are changed at random at a certain probability for each gene (locus) of the individual chromosome. In one embodiment, mutation is provided according to a normal distribution. In one embodiment, when an individual chromosome is crossed with itself or with an identical chromosome, both of the parent individuals to be crossed are made to mutate at a higher probability rate.

In one embodiment, the static and dynamic throttle characteristics are combined together into a single individual and optimized collectively. In one embodiment, the static characteristics are preset (e.g. by the user 101), and only the dynamic characteristics are optimized. In one embodiment, the dynamic and static characteristics are optimized independently. In one embodiment, the static characteristics are optimized and fixed in advance, and the dynamic characteristic are optimized during use.

The Evolution Efficiency Improvement Process (EEIP)

The evolution efficiency improvement process module 206, shown in FIG. 2, includes the data accumulator 210, the model-creator 212, the individual-set module 214, and a reliability module 216.

The Data Accumulator

Each individual chromosome can be represented as an expressive chromosome (i.e., in an expressive format) and/or as a genetic chromosome (i.e., in a genetic format). The term "expressive chromosome" refers to a chromosome formatted by coding the parameter values. The term "genetic chromosome" refers to a chromosome made by converting the parameter values into bits. The conversion between expressive format and genetic format can be made with the equation below.

$$X_i = \alpha Y_i + \beta$$

where $X_i$ stands for each of the parameter values (e.g., SP1, SP2, DR, and AG) comprising the expressive chromosome, $Y_i$ stands for each bit value of the genetic chromosome, i is the number of the (for example, i=1 . . . 4 for the four parameters SP1 SP2 DR, and AG). The values $\alpha$ and $\beta$ are coefficients that can be changed arbitrarily to produce a desired mapping between the expressive and genetic formats.

The data accumulator 210 determines the correspondence between an individual chromosome and its fitness evaluation value, and stores the chromosome and its fitness evaluation value (step 703 in the flowchart shown in FIG. 7). In the optimizer 204, each individual chromosome is converted from the expressive type into the genetic type. This conversion is done for the purpose of improving calculation efficiency and reducing the amount of stored data. However, the difference between individual chromosomes of the genetic type is typically small, and so creating the evaluation model in the model-creator 212 can sometimes become more difficult. Therefore, in one embodiment, chromosomes are stored in the data accumulator 210 in the expressive format.

Description of the Evaluation Model-Creator

The model-creator 212, uses data accumulated in the data accumulator 210 to create an evaluation model for predicting the fitness evaluations of individual chromosomes. The evaluation model attempts to estimate or predict the fitness evaluation value that the user 101 will assign to a particular chromosome (see. e.g., step 705 in the flowchart shown in FIG. 7 below). In one embodiment, a Radial Basis Function (RBF) is used to create the fitness evaluation model.

In one embodiment, the evaluation model includes an RBF which receives, as an input, a chromosome that includes the parameter values (SP1, SP2, DR, and AG), and outputs an estimated fitness evaluation value. An RBF which receives input of throttle characteristics x and outputs evaluation values y is given by:

$$y = f(x) = \sum_{i=1}^{N} c_i g(x; x_i)$$

where, N denotes the number of accumulated data values, and $x_i$ denotes the throttle characteristic accumulated data.

From the accumulated data, the basis function g and the coefficient $c_i$ of the above function are calculated and the above function is used as the evaluation model.

Calculation of the basis function g and the coefficients $c_i$ from the accumulated data is done as follows. First, contradiction data in the accumulated data are processed. That is, in the case where there are different data of the evaluation value y for the same individual chromosome x (namely the individual chromosome of the same throttle characteristic), a mean value is used as the fitness evaluation value y of that individual chromosome. The evaluation value may also be weighted according to the time when the fitness evaluation is made. For example, when the same individual chromosome gets a fitness evaluation value of 50 points in a first evaluation and 100 points in a second evaluation, normally the evaluation value for the individual chromosome is the mean of the two, 75 points. However, when a model is created with importance attached to new data, data are weighted so that newer data have more weight to make the fitness evaluation value nearer to that of the new data, for example 80 points or 90 points in the above example.

When the contradiction data processing is over, the basis function g is determined using the equation below.

$$g(x; x_i) = \exp\left(-\frac{\|x - x_i\|^2}{2\sigma^2}\right)$$

where $\sigma$ denotes a basis function parameter and $x_i$ denotes the throttle characteristic accumulated data.

After calculating the basis function g using the above equation, the coefficient $c_i$ is calculated with the equation below.

$$(G + \lambda I)C = Y$$

In the above equation, each element of G is an N×N matrix of $g_{ij} = g(x_i; x_j)$. The symbol I denotes an N×N unitary matrix. The symbol $\lambda$ denotes a normalizing parameter. The symbol C denotes a column vector $C = [c_1, c_2, \ldots, c_N]$ of N rows, and Y denotes a column vector $Y = [y_1, Y_2, \ldots, y_N]$. The creation and renewal of the above-described fitness evaluation model can be made at any appropriate time. For example, in one embodiment, the fitness evaluation model is created (or renewed) at a time when evaluations of all the individual chromosomes in a set of chromosomes (e.g. a generation) are complete (using all the data accumulated in the data accumulating module up to that time).

Creating the evaluation model in this way with the RBF function on the basis of actual fitness evaluation values makes it possible to estimate the fitness evaluation values of the individuals created by the evolutionary calculation.

In one embodiment, the evaluation model includes a learning algorithm. Learning algorithms include, for example, a neural network, a fuzzy inference method, a fuzzy neural network, a CMAC, other function approximation methods, etc. The RBF function makes its output 0 in a region not learned yet and having no measurement value. In contrast, a neural network outputs some value even in an unlearned region. However, the reliability of the output value will not necessarily be high for an unlearned region.

In one embodiment, a model based on the RBF, which provides a more reliable output in the learned region, is used instead of a model that has the possibility of outputting values in unlearned regions because of the questionable reliability of such values in the unlearned region.

Evaluation Value Reliability Calculating Module

The reliability module 216 calculates, using data accumulated in the data accumulator 210, the reliability of the estimated fitness evaluation values of respective individual chromosomes as calculated by the fitness-evaluation model. The reliability is calculated, for example, as follows: 1) throttle characteristics represented with respective individual chromosomes are expressed as vectors; 2) the distance between "an individual chromosome for which reliability is sought" and "an individual chromosome, out of those related to the accumulated data, located at the nearest distance from the individual for which the reliability is sought" is determined; and 3) the reciprocal of the distance is the reliability. The nearer the individual for which the evaluation value is estimated with the evaluation model is to the individual already learned, the higher is the reliability.

The Individual-Set Module

Figure 8:
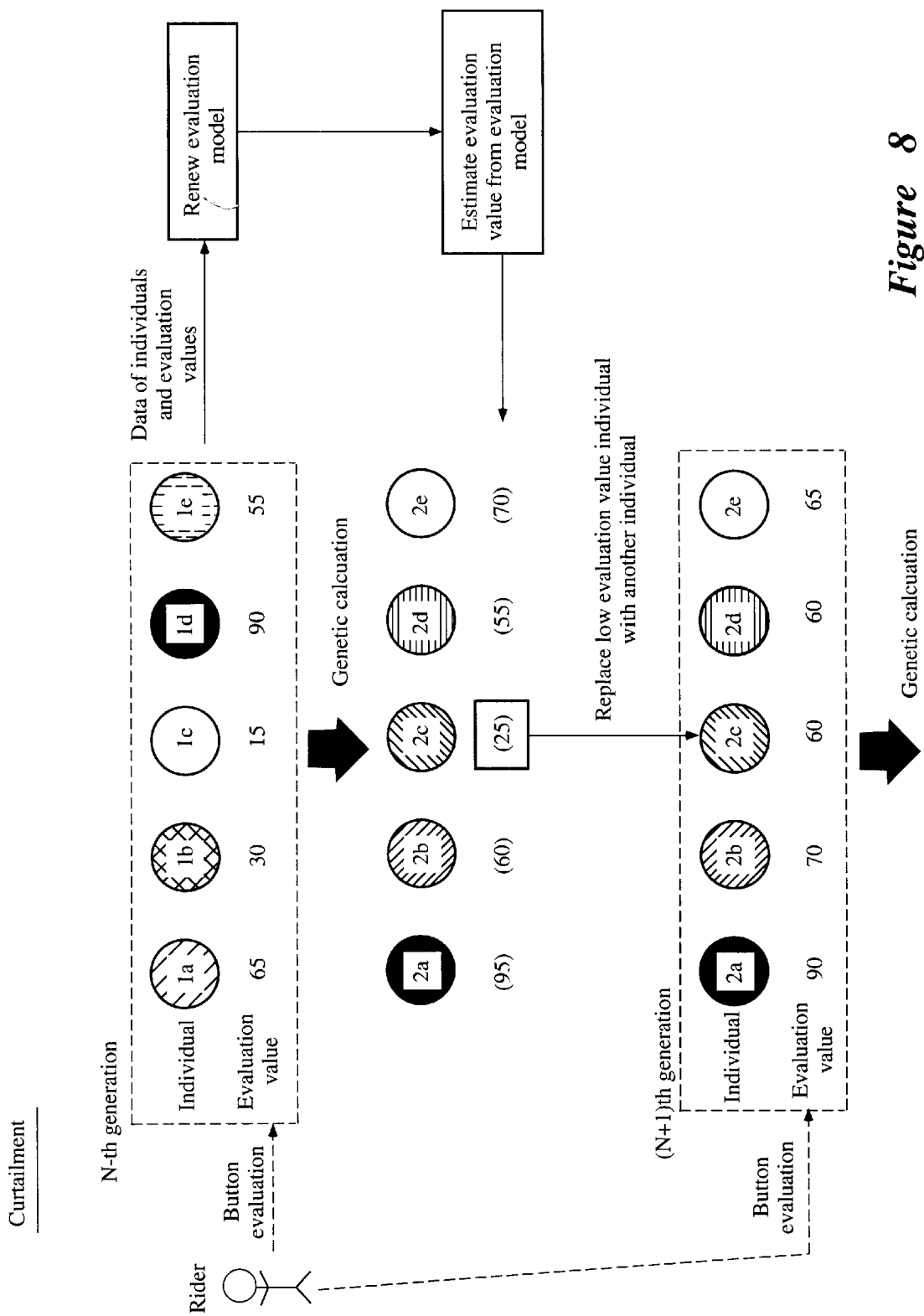
FIG. 8 illustrates the individual-set process in the individual-set operating module.
Figure 9:
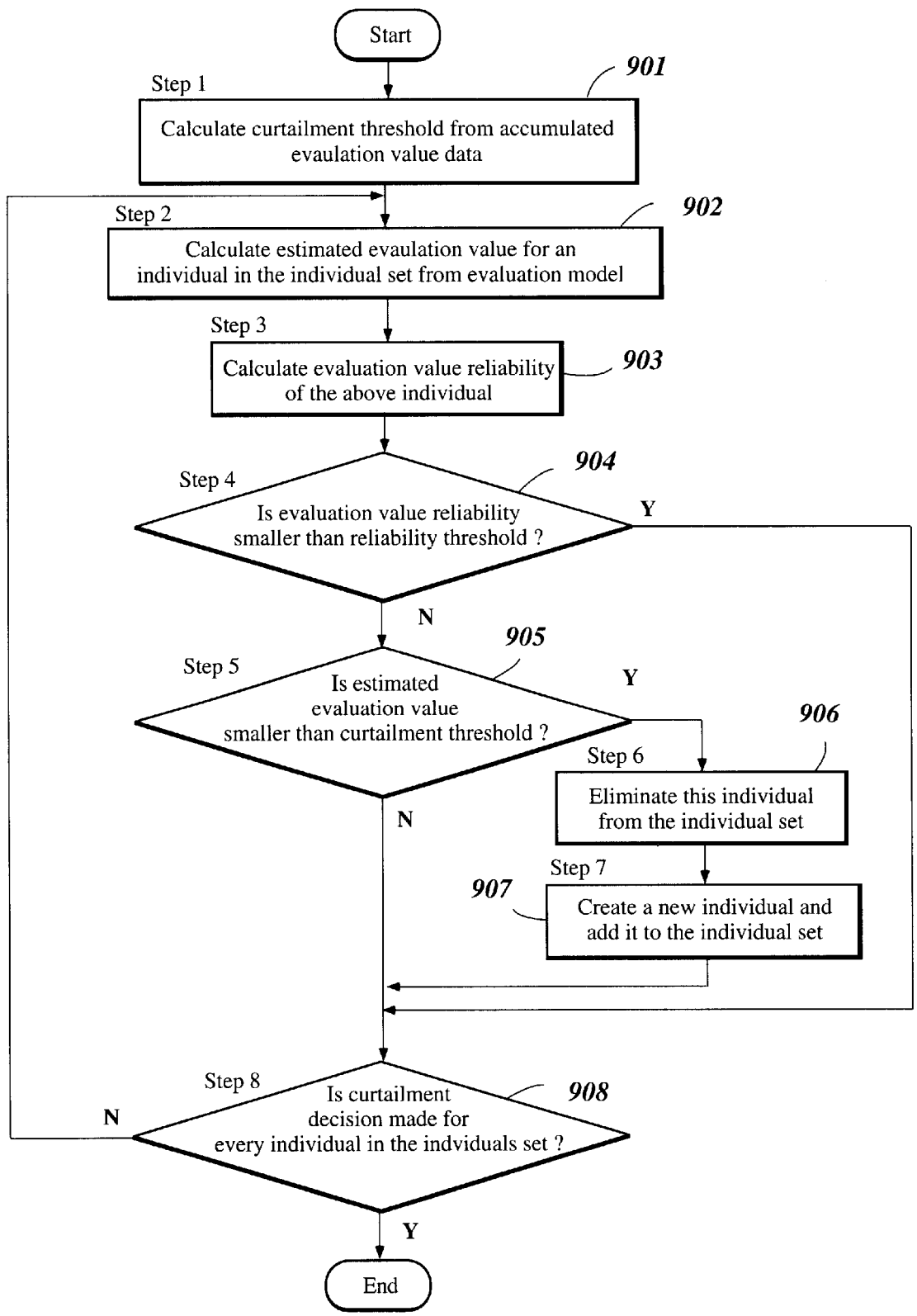
FIG. 9 is a flowchart of one embodiment of the individual-set process in the individual-set operating module.

FIG. 8 and FIG. 9 show the processing of a set of individual chromosome in the individual-set module 214. The individual-set module 214 estimates the fitness evaluation value for each candidate chromosome in a next generation using the evaluation model created by the model creator 212.

FIG. 8 illustrates the operation of the individual-set module 214 by showing chromosomes 1a–1e of an N-th generation, and a candidate set of chromosomes 2a–2e of an (N+1)-th generation. The chromosomes 1a–1a have actual fitness evaluation values of 65, 30, 15, 90, and 55 respectively. The chromosomes 2a–2e have estimated fitness evaluation values of 95, 60, 25, 55, and 70 respectively. After the evaluation model is updated on the basis of the user's evaluations for the individuals 1a to 1e of the N-th generation, the individuals 2a to 2e of the (N+1)th generation are subjected to the individual-set (described in the flowchart of FIG. 9 below). Since the estimated evaluation value for the individual 2c is smaller than the curtailment threshold, the individual 2c is deleted and a new individual 2c' is added. The actual fitness evaluation values of the (N+1)-th generation chromosomes 2a, 2b, 2c', 2d, and 2e are then 90, 70, 60, 60, and 65 respectively.

FIG. 9 is a flowchart showing how the individual-set module 214 operates. The Flowchart begins at a step 901 where the individual-set module 214 determines a curtailment threshold. The curtailment threshold can be a fixed value, or it can be a calculated value (such as a mean or variance) determined statistically from fitness evaluation values accumulated in the data accumulator 210. After determining the curtailment threshold, the individual-set module 214 calculates an estimated fitness evaluation value for an individual chromosome in (N+1)-th generation (step 902). The estimated fitness evaluation value is calculated using the fitness evaluation model. Following step 902, the evaluation value reliability of the estimated evaluation value is calculated in the reliability module 216 (step 903).

In a decision block 904 following step 903, a comparison is made as to whether or not the fitness evaluation value reliability is greater than a predetermined "reliability threshold." If, in the step 904, the fitness evaluation value reliability is, smaller than the reliability threshold, then the process advances to a step 906; otherwise the process advances to a decision block 908.

In the step 906 the individual chromosome corresponding to the estimated evaluation value is deleted, and the process advances to a step 907 where a newly created individual chromosome is added to the chromosome set in place of the deleted chromosome.

In one embodiment, to create a new individual chromosome in the step 907, a plural number of individuals are created at random, their estimated evaluation values are determined, and the one of them having the highest estimated evaluation value is the new chromosome. In one embodiment, a new individual chromosome is created so that its estimated evaluation value is greater than at least that of the deleted chromosome, and preferably greater than the curtailment threshold. After completing step 907, the process advances to the decision block 908.

In the decision block 908, a determination is made as to whether the comparison is finished for all of the individual chromosomes in the chromosome. If the comparison is not finished for all of the chromosomes, then the process jumps back to the step 902. If the comparison is finished, then the flowchart of FIG. 9 exits.

As described above, it is possible to create a fitness evaluation model capable of estimating fitness evaluation values with relatively high accuracy by accumulating the data of combinations of the individual chromosomes and the fitness evaluation values of the chromosome set actually evaluated by the user 101 in the optimizer 204, and then creating the evaluation model on the basis of the accumulated data. When a new generation (set) of individual chromosomes is created in the optimizer 204 (before the user 101 evaluates the chromosomes), it is possible to estimate the fitness evaluation values for the new chromosomes (using the evaluation model) and to delete chromosomes that will probably be given low evaluations by the user 101. This helps the user 101 and improves the evolution efficiency of the optimizer 204.

In the above embodiment, the EEIP 206 is provided with the reliability module 216. The reliability module 216 is used to prevent the process of the individual-set module 214 (FIG. 9) from being applied to the estimated fitness evaluation values having low reliability. However, the reliability module 216 is optional and can be omitted depending on various factors, such as whether priority is given to higher evolution efficiency or to shorter overall calculation time and greater available memory capacity.

Figure 10:
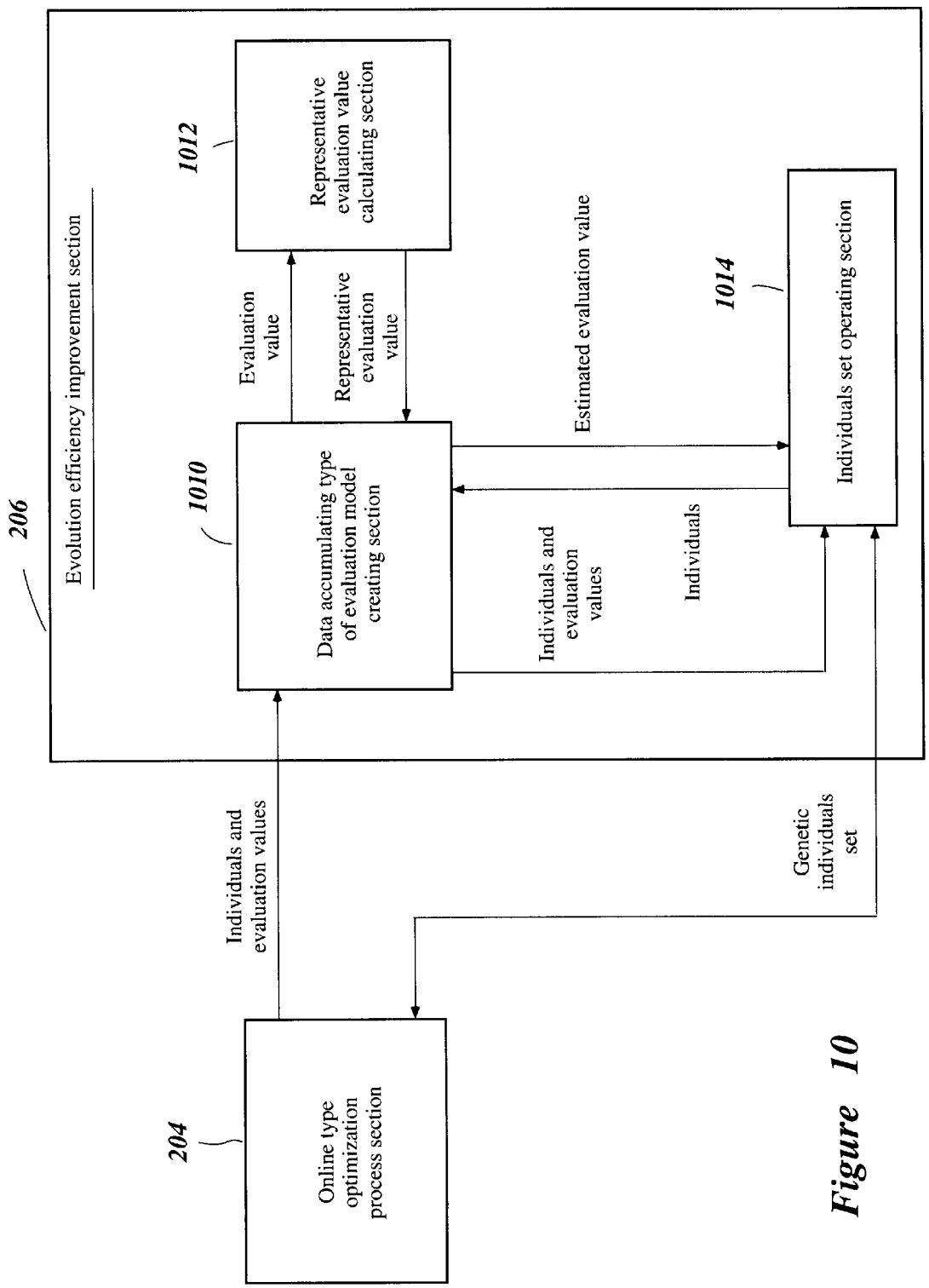
FIG. 10 is a block diagram of one embodiment of an evolution efficiency-improvement module.

FIG. 10 is a block diagram of an EEIP 1006. The EEIP 1006 is an alternate embodiment of the EEIP 156 and includes a data accumulation type of evaluation model creating module (hereinafter simply referred to as the accumulator-modeler) 1010, a representative evaluation value calculating section (representative calculator) 1012, and an individual-set module 1014. The accumulator-modeler 1010 provides an evaluation value to an input of the representative calculator 1012. The representative calculator 1012 provides a representative evaluation value to an input of the accumulator-modeler 1010. The data accumulator 1010 provides an estimated evaluation value to an input of the individual-set module 1014, and the Individual-Set module provides individual chromosomes and evaluation values to the accumulator-modeler 1010. The accumulator-modeler 1010 also provides stored individual chromosomes and evaluation values to the individual-set module 1014.

The optimizer 204 is also shown in FIG. 10. The optimizer 204 provides individual chromosomes and evaluation values to the data accumulator 1010, and a set of candidate chromosomes to the individual-set module 1014. The individual-set module 1014 evaluates and modifies the candidate chromosomes as necessary, and then returns a set of next generation chromosomes to the optimizer 204.

The Data Accumulation Model-Creating Module (Accumulator-Modeler)

Figure 11:
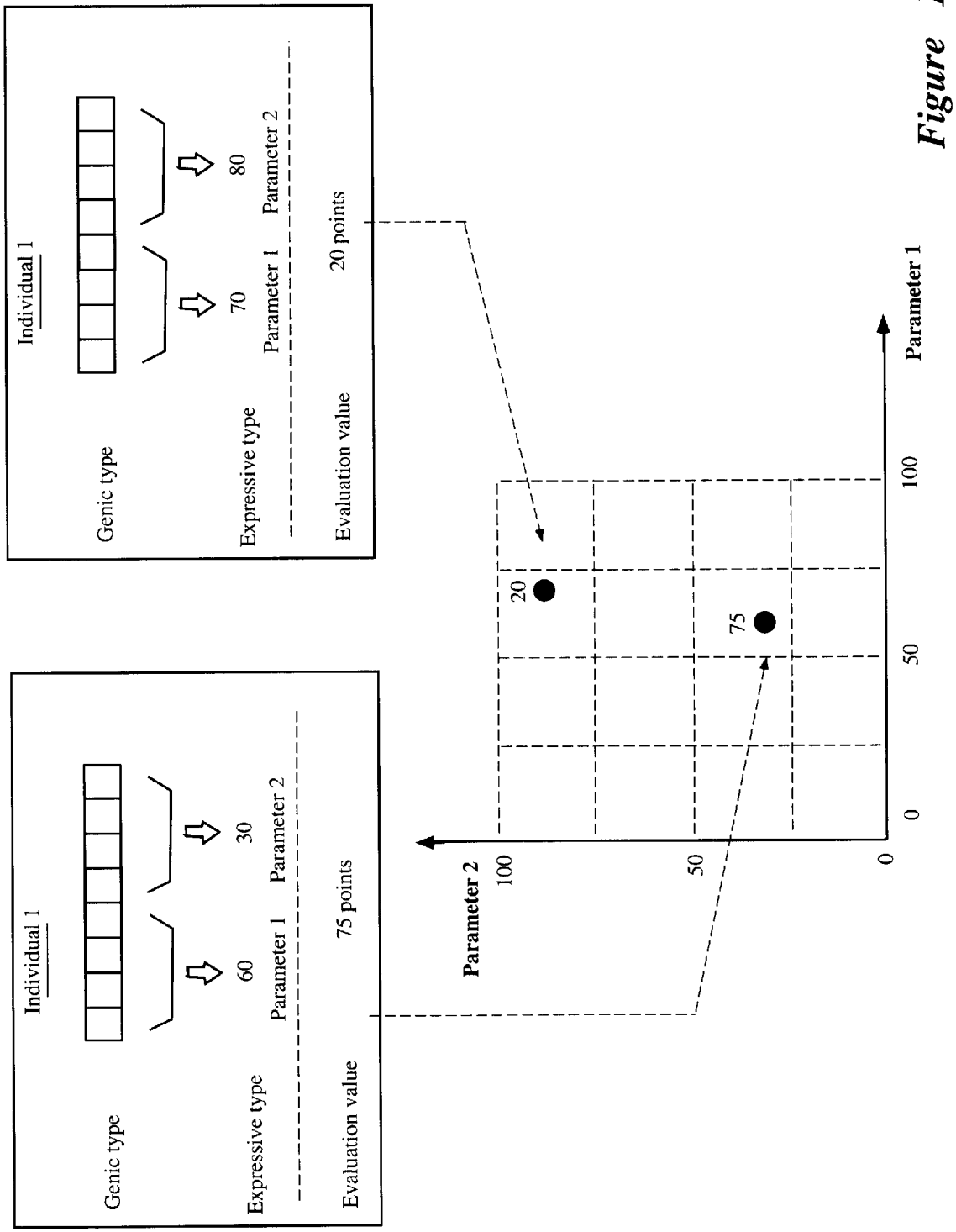
FIG. 11 shows operation of an evaluation model-creating method in a data accumulation-type of evaluation model-creating module.

FIG. 11 illustrates operation of the accumulator-modeler 1010. As shown in FIG. 11, the accumulator-modeler 1010 creates divided regions corresponding to individual chromosomes used in the optimizer 204. Each time a fitness evaluation value for an individual chromosome is provided to the optimizer 204, an actual fitness evaluation value for the individual chromosome is accumulated in the region corresponding to that chromosome. For simplicity (due to the difficulty of illustrating more than a two-dimensional space) FIG. 11 shows an example of data accumulation wherein the chromosomes used in the optimizer 204 have two parameter values. Each individual chromosome is coded to produce two parameter values when the chromosome is converted from the genetic type to the expressive type.

The accumulator-modeler 1010 "plots" the parameter values relative to vertical and horizontal axes (one axis for each parameter) using 16 two-dimensional divided regions (the parameter values along each axis being divided into four parts).

For example, in the case shown in FIG. 11, the actual fitness evaluation value of 75 is given by the user 101 for a first chromosome. For the first chromosome, in the expressive representation, the first parameter has a value of 60 and the second parameter has a value of 30. The accumulator-modeler 1010 converts the first chromosome into the expressive type, and the actual fitness evaluation value of 75 of the first chromosome is accumulated in the region corresponding to the xy coordinates [60,30]. Similarly, a second chromosome has a fitness value of 20, and parameter values of 70 and 80. The accumulator-modeler 1010 "plots" the second chromosome value 20 at the. xy coordinates [70,80].

When the accumulator-modeler 1010 is used for evolving the throttle characteristics with four parameter values (e.g., SP1, SP2, DR, and AG) as discussed above, the divided regions of the accumulator-modeler 1010 are four-dimensional. As the number of parameter values for each chromosome increases, the number divided regions become multidimensional, the number of calculations increases, and the amount of stored data to, be accumulated increases. In such circumstances, parameter values of the chromosomes can be further converted to other parameter values to reduce the number of parameter values in the expressive chromosome. In one embodiment of the throttle control system, using four parameter values (SP1, SP2, DR, and AG) for the throttle characteristics, the accumulator-modeler 1010 can be configured as a three-dimensional space, divided into 125 regions, by dividing the response degrees for each of the low, medium, and high speeds into five parts.

If data is accumulated limitlessly in the regions, the amount of data becomes enormous. Therefore, it is preferable to limit the amount of data by only storing data from recent chromosomes or recent generations. In one embodiment, the fifty most recent chromosomes or generations of chromosomes are stored.

The Representative Value Calculator

Figure 12:
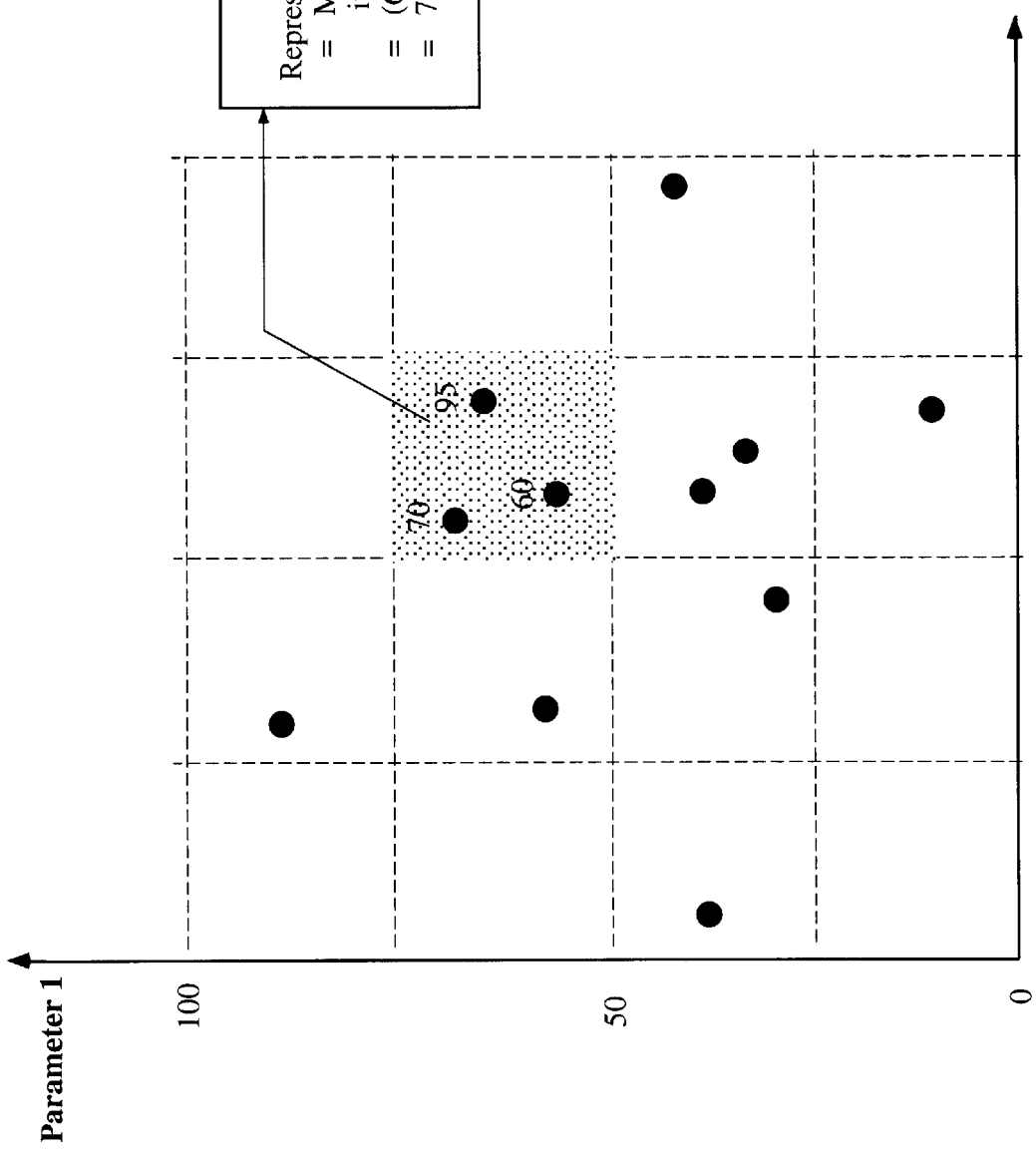
FIG. 12 shows operation of a representative evaluation-value calculating method in the representative evaluation-value calculating module.

FIG. 12 illustrates operation of the representative value calculator 1012. The representative value calculator. 1012 calculates the mean value of the actual fitness evaluation values of the chromosomes contained in each region shown in FIG. 11. The mean value of each region is the representative fitness evaluation value for that region. However, for the regions where no actual fitness evaluation value is accumulated (unlearned regions), the representative evaluation value is not calculated. In this way, representative evaluation values having a low reliability (because no data is available) are avoided.

Individual-Set operating Module 1014

The individual-set module 1014, before actually evaluating each chromosome of each generation, estimates the fitness evaluation value for each chromosome by using the evaluation model created in the accumulator-modeler 1010, and processes each chromosome on the basis of the estimated fitness evaluation value. For each chromosome: the region (illustrated in FIG. 11) is determined; the representative fitness evaluation value for that region is calculated; and the representative fitness evaluation value is made the estimated evaluation value for that chromosome.

Figure 13:
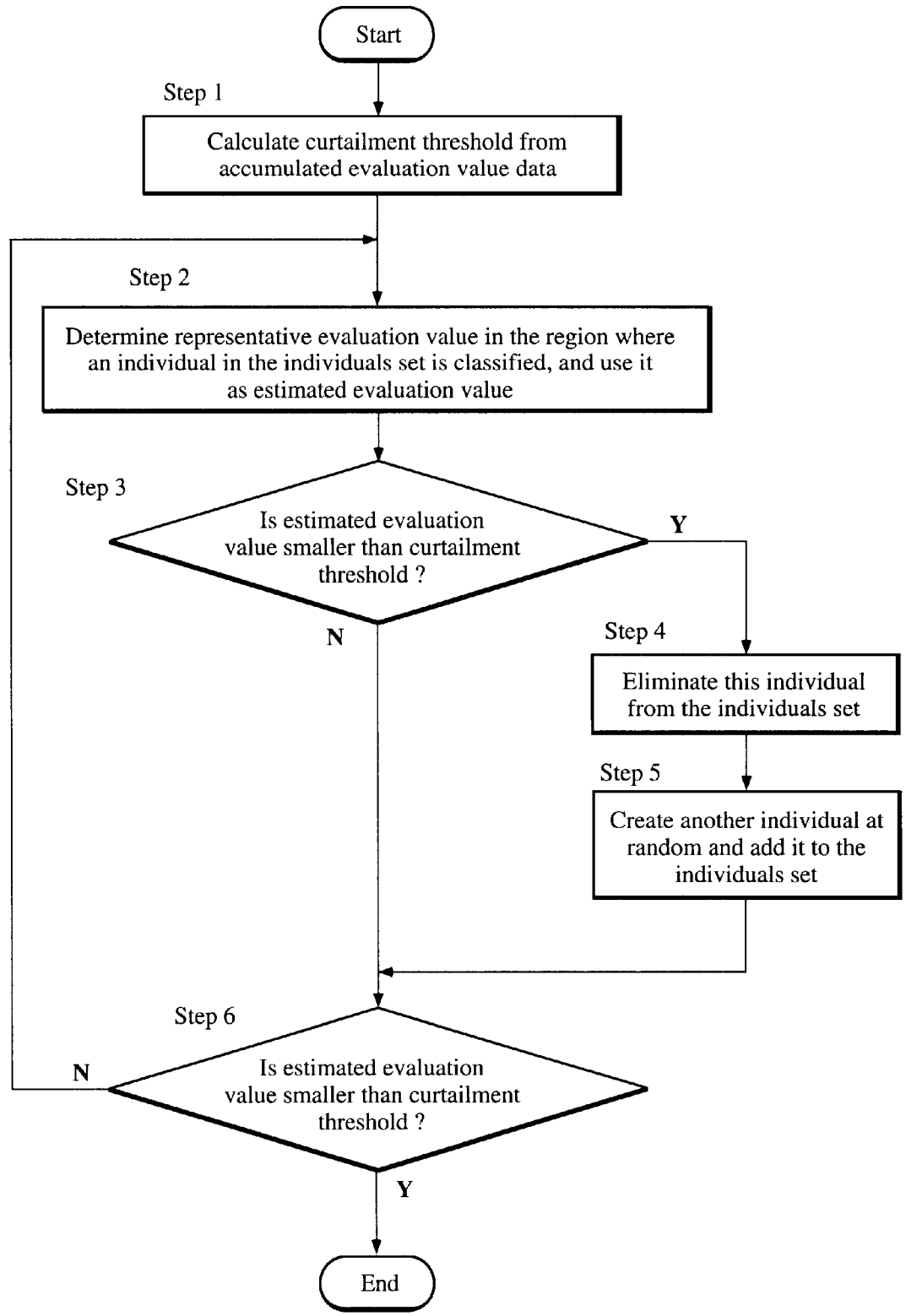
FIG. 13 is a flowchart showing an alternate embodiment of operation of the individual-set operating module.

FIG. 13 is a flowchart showing the operation of the individual-set module 1014. As shown in a first step 1301, when the actual fitness evaluation (that is, the evaluation by the user 101) is complete for the chromosomes in the N-th generation, a "curtailment threshold" is calculated using the mean of the fitness evaluation values accumulated in the accumulator-modeler 1010. The process then advances to a step 1302 where the estimated fitness evaluation value is calculated with the above-described method for an individual chromosome in the (N+1)-th generation.

The process then advances to a decision block 1303, where a determination is made as to whether or not the estimated fitness evaluation value is greater than the curtailment threshold calculated in step 1301. If the estimated fitness evaluation value is not greater, then the process advances to a step 1304; otherwise, the process advances to a step 1306. In the step 1304, the chromosome is deleted from the chromosome set. Following step 1304, the process advances to a step 1305 where a new chromosome is created and added to the chromosome set in place of the just-deleted chromosome.

In one embodiment, to create a new individual in step 1305, a plurality of individuals are created at random, their estimated evaluation values are determined, and the one of them having the highest estimated evaluation value is the new chromosome. In one embodiment, new chromosome is created so that its estimated evaluation value is greater than at least that of the deleted chromosome, preferably greater than the curtailment threshold.

The above process is repeated until it is applied to all the individuals within the individual-set (via the decision block 1306 that loops back to step 1302 until all chromosomes have been processed).

As described above, the use of divided regions simplifies the calculation in comparison with the use the RBF.

The individual-set module, whether based on regions (as in the module 1014) or the RBF (as in the module 214): calculates the estimated fitness evaluation value of each chromosome, deletes chromosomes having an estimated evaluation value smaller than the curtailment threshold; and creates new chromosomes to replace deleted chromosomes. The operation applied to the chromosomes is not limited to that of the above embodiments, but may be any operation as long as it enhances the evaluation of a set of chromosomes when the evaluation model is used before the chromosomes of the next generation created in the evolutionary calculating module are actually evaluated for fitness.

Figure 14:
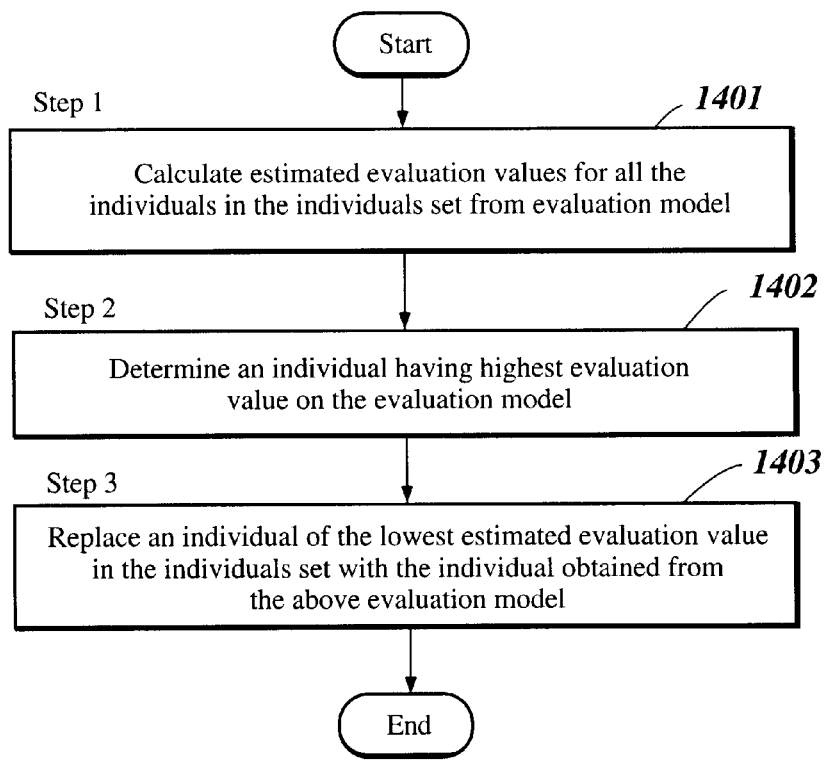
FIG. 14 is a flowchart showing one embodiment for selecting an individual in the individual-set operating module.

FIG. 14 is a flowchart showing yet another embodiment of an individual-set module. In a first step 1401 (in FIG. 14), the estimated fitness evaluation values are calculated for the chromosomes in the chromosome set of a new generation created by the optimizer 204. In a step 1402, following step 1401, an optimum chromosome having the highest fitness evaluation value with the current evaluation model is created using the evaluation model. In a final step 1403, following step 1402, the optimum chromosome created in step 1402 is used to replace a chromosome having the lowest evaluation value.

In one embodiment, when the evaluation model is based on an RBF, an autonomous evolution module, separate from the optimization process module which is the subject of efficiency improvement, is provided to autonomously evolve individuals according to evaluations given with the evaluation model, and the individual evolved with the autonomous evolution process module is made the optimum individual.

In one embodiment, when the evaluation model uses divided regions, the chromosome contained in the region having the highest representative evaluation value is made the optimum chromosome. Operating the individual-set module so that the chromosome having the lowest estimated evaluation value is replaced with the optimum chromosome often makes it unnecessary to make a determination for every individual and thus simplifies the individual-set process.

Figure 15:
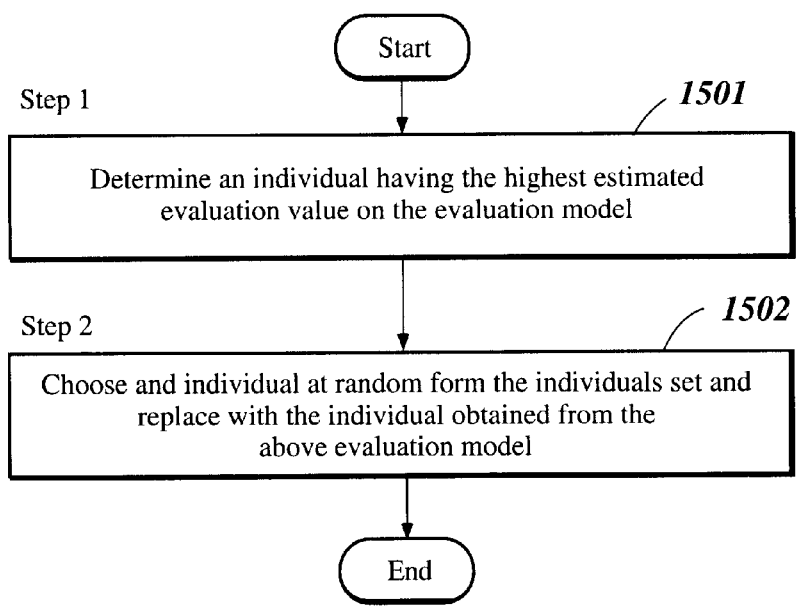
FIG. 15 is a flowchart showing one embodiment for selecting an individual in the individual-set operating module.

FIG. 15 a flowchart (having steps 1501 and 1502) for still another embodiment of an individual-set operating module. In step 1501, an optimum chromosome having the highest evaluation value with the current evaluation model is created using the evaluation model. In step 1502 an individual chromosome is chosen at random out of the individual-set of the new generation created in the optimizer 204, and the randomly chosen chromosome is replaced with the optimum chromosome.

Choosing a chromosome at random from the set and replacing the randomly chosen chromosome with the optimum chromosome typically eliminates the necessity of calculating the estimated fitness evaluation values for all of the chromosomes in the set. Thus, the individual-set process is further simplified.

In the above embodiment, at least one individual chromosome out of the chromosome-set created in the optimizer 206 is deleted, and chromosomes corresponding in number to the deleted chromosome (or chromosomes) are newly created using the evaluation model and added to the set. However, the operation method of the individual-set using the evaluation model is not limited to that of the above embodiment but may be any other method as long as the individual-set is operated before the individuals are actually evaluated. For example, the process can include addition of an individual chromosome created using the evaluation model without deleting individuals at all, or can include deletion of an individual chromosome from the individual-set without replacing the deleted chromosome.

In the above descriptions, the optimizer 204 is typically described as using a so-called interactive type of evaluation in which each chromosome in the chromosome set is evaluated directly by the user 101. However, the optimizer 204 need not be limited to the above embodiment but may be for example a so-called autonomous type of fitness evaluation in which each chromosome in the chromosome set is evaluated with an actual evaluation purpose model or fitness function.

The controller of the above embodiment performs the so-called one-layer type of evolution process in which the controller evolves directly, using the optimizer 204, the control parameters of the basic control module 208 which directly outputs the operation amount to the controlled subject. However the manner of performing the process is not limited to a one-layer evolution.

For example, in one embodiment, the basic control module 150 for outputting the control value to a controlled plant 151 can be divided into an execution control module and a learning-purpose control module to perform a so-called two-layer type of evolution process in which the control parameters evolved in the optimization process module are learned by the learning-purpose control module. The learning-purpose control module is then replaced with the execution purpose module.

In one embodiment, a compensation control module for outputting compensation information to the basic control module 150 is provided in addition to the basic control module 150 to perform a so-called two-layer type evolution process in which the control parameters of the compensation control module are directly evolved in the optimizer 153.

In one embodiment, the compensation control module is divided into two parts, one part for learning and the other part for execution to perform a so-called three-layer evolution process in which a control parameter evolved in the optimizer 153 is learned in a learning control module which is then replaced with an execution control module.

As described above, the optimization control system can be configured such that control parameters affecting the characteristics of a control system are made to evolve based on actual fitness evaluations by repeating the steps of: creating a plurality of chromosomes corresponding to the control parameters; making a set of the chromosomes the current generation, choosing parent individuals for the next generation from the current generation based on at least actual evaluations; and creating a set of chromosomes for the next generation on the basis of at least the parent individuals. An evaluation model is created on the basis of a relation between each chromosome and the actual fitness evaluation value for each individual. The evaluation model is used before actual fitness evaluation is made. As a result, it is possible to eliminate in advance, individuals that are expected to get low fitness evaluations and/or to add in advance, individuals that are expected to get high fitness evaluations. This permits a user to enhance the evaluation of the chromosomes in a generation before performing actual fitness evaluations, to avoid wasteful evaluation, and to improve evolution efficiency.

Although the foregoing has been a description and illustration of specific embodiments of the invention, various modifications and changes can be made thereto by persons skilled in the art, without departing from the scope and spirit of the invention as defined by the following claims.

What is claimed is:

1. A control method wherein control parameters affecting the operation of a controlled plant are evolved based on user evaluations by: defining a chromosome structure based on one or more control parameters; selecting a set of chromosomes to be a current generation; choosing parent chromosomes for a next generation from said current generation according to an actual fitness evaluation of one or more of said chromosomes in said current generation; creating a set of candidate chromosomes; evaluating one or more of said candidate chromosomes using an evaluation model to compute one or more estimated fitness evaluations; generating a set of next generation chromosomes from said candidate chromosomes using said estimated fitness evaluations by selecting candidate chromosomes that are relatively more fit according to said estimated evaluation value and deleting candidate chromosomes that are relatively less fit according to said estimated evaluation value.

2. The control method of claim 1, wherein said actual fitness evaluation is an evaluation made by a user.

3. The control method of claim 1, wherein said actual fitness evaluation is an evaluation made without reference to said evaluation model.

4. The control method of claim 1, wherein said evaluation model comprises: a plurality of divided regions corresponding to a plurality of parameters; accumulating actual fitness evaluation values of chromosomes evaluated in corresponding regions; and calculating estimated fitness evaluation values of said divided regions on the basis of actual fitness evaluation values accumulated in respective regions.

5. A control method wherein control parameters affecting the operation of a controlled plant are evolved based on user evaluations by: defining a chromosome structure based on one or more control parameters; selecting a set of chromosomes to be a current generation, choosing parent chromosomes for a next generation from said current generation according to an actual fitness evaluation of one or more of said chromosomes in said current generation, creating a set of candidate chromosomes; evaluating one or more of said candidate chromosomes using an evaluation model to compute one or more estimated fitness evaluations: generating a set of next generation chromosomes from said candidate chromosomes by using said estimated fitness evaluations, "wherein said evaluation model comprises a function using chromosomes as inputs, and where said function provides one or more estimated fitness evaluation values as outputs," wherein said function is a radial basis function.

6. A control method wherein control parameters affecting the operation of a controlled plant are evolved based on user evaluations by: defining a chromosome structure based on one or more control parameters; selecting a set of chromosomes to be a current generation; choosing parent chromosomes for a next generation from said current generation according to an actual fitness evaluation of one or more of said chromosomes in said current generation; creating a set of candidate chromosomes; evaluating one or more of said candidate chromosomes using an evaluation model to compute one or more estimated fitness evaluations; generating a set of next generation chromosomes from said candidate chromosomes by using said estimated fitness evaluations, wherein deletion of candidate chromosomes in said set of candidate chromosomes is made on the basis of said estimated evaluation value.

7. The control method of claim 6, wherein candidate chromosomes having estimated fitness evaluation values lower than a specified threshold value are deleted from said set of candidate chromosomes.

8. The control method of claim 6, wherein chromosomes are deleted in an order of lower estimated fitness evaluation value.

9. The control method of claim 6, wherein said evaluation model is used to create a new chromosome having an estimated evaluation value higher than that of at least a deleted chromosome, and wherein said new chromosome is added to said set of candidate chromosomes.

10. A control method wherein control parameters affecting the operation of a controlled plant are evolved based on user evaluations by: defining a chromosome structure based on one or more control parameters; selecting a set of chromosomes to be a current generation choosing parent chromosomes for a next generation from said current generation according to an actual fitness evaluation of one or more of said chromosomes in said current generation; creating a set of candidate chromosomes; evaluating one or more of said candidate chromosomes using an evaluation model to compute one or more estimated fitness evaluations; generating a set of next generation chromosomes from said candidate chromosomes by using said estimated fitness evaluations, wherein said evaluation model is used to create new chromosomes at random, and wherein said new chromosomes are added to said set of candidate chromosomes in an order of higher estimated evaluation value.

11. A control method wherein control parameters affecting the operation of a controlled plant are evolved based on user evaluations by: defining a chromosome structure based on one or more control parameters; selecting a set of chromosomes to be a current generation; choosing parent chromosomes for a next generation from said current generation according to an actual fitness evaluation of one or more of said chromosomes in said current generation; creating a set of candidate chromosomes; evaluating one or more of said candidate chromosomes using an evaluation model to compute one or more estimated fitness evaluations; generating a set of next generation chromosomes from said candidate chromosomes by using said estimated fitness evaluations, wherein said evaluation model is used to create a new chromosome having an estimated fitness evaluation value higher than at least a specified threshold value and wherein said new chromosome is added to said set of candidate chromosomes.

12. A control method wherein control parameters affecting the operation of a controlled plant are evolved based on user evaluations by: defining a chromosome structure based on one or more control parameters; selecting a set of chromosomes to be a current generation; choosing parent chromosomes for a next generation from said current generation according to an actual fitness evaluation of one or more of said chromosomes in said current generation; creating a set of candidate chromosomes; evaluating one or more of said candidate chromosomes using an evaluation model to compute one or more estimated fitness evaluations; generating a set of next generation chromosomes from said candidate chromosomes by using said estimated fitness evaluations, wherein a randomly selected chromosome is deleted from said set of candidate chromosomes, and wherein a new chromosome is created to have a high estimated fitness evaluation value, and wherein said new chromosome is added to said set of candidate chromosomes in place of said randomly selected chromosome.

13. The control method of claim 12, wherein said new chromosome is created to have an estimated fitness evaluation value higher than a specified threshold value.

14. An apparatus comprising: a control module; an optimizer, and an evolution efficiency-improving module, said control module configured to control a controlled plant, said optimizer causing control parameters affecting the characteristics of said control module to evolve based on actual fitness evaluations of chromosomes representing said control parameters, said control module selecting a current set of chromosomes to be a current generation, said control module choosing parent chromosomes for a next generation set of chromosomes from said current set using at least actual fitness evaluations, said control module creating one or more chromosomes of said next generation set on the basis of at least the parent chromosomes, said evolution efficiency-improving module comprising a model-creation module for creating an evaluation model using actual fitness evaluation values, said evaluation model configured to estimate actual fitness evaluation values, and a chromosome-set module for pre-processing said next generation based on estimated actual fitness evaluation values by selecting chromosomes that are relatively more fit according to said estimated evaluation value and deleting chromosomes that are relatively less fit according to said estimated evaluation value.

15. The apparatus of claim 14, comprising means for receiving an evaluation made by a user as an actual fitness evaluation.

16. The apparatus of claim 14, wherein a fitness function other than said evaluation model is used to perform actual evaluations of said chromosomes.

17. The apparatus of claim 14, wherein said model-creation module comprises an accumulator for accumulating data of previous chromosomes and data of actual fitness evaluation values for said previous chromosomes, and wherein said evaluation model is created on the basis of data accumulated in said accumulator.

18. The apparatus of claim 17, wherein said model-creation module uses a plurality of regions corresponding to groups of chromosomes, accumulates actual fitness values in respective regions corresponding to evaluated chromosomes, and wherein a data accumulation-type of evaluation model for calculating estimated evaluation values of chromosomes in said regions is created on the basis of actual fitness evaluation values accumulated in respective regions.

19. An apparatus comprising: a control module; an optimizer, and an evolution efficiency-improving module, said control module configured to control a controlled plant, said optimizer causing control parameters affecting the characteristics of said control module to evolve based on actual fitness evaluations of chromosomes representing said control parameters, said control module selecting a current set of chromosomes to be a current generation, said control module choosing parent chromosomes for a next generation set of chromosomes from said current set using at least actual fitness evaluations, said control module creating one or more chromosomes of said next generation set on the basis of at least the parent chromosomes, said evolution efficiency-improving module comprising a model-creation module for creating an evaluation model using actual fitness evaluation values, said evaluation model configured to estimate actual fitness evaluation values, and a chromosome-set module for pre-processing said next generation based on estimated actual fitness evaluation values, wherein said model-creating module creates an evaluation model comprising a function, said function using chromosomes as inputs, said function outputting estimated fitness evaluation values, wherein said function comprises a radial basis function.

* * * * *